(12) United States Patent
Endo et al.

(10) Patent No.: US 9,043,090 B2
(45) Date of Patent: May 26, 2015

(54) AUTOMATIC STEERING APPARATUS

(75) Inventors: Masaya Endo, Tokyo (JP); Masahiko Kurishige, Tokyo (JP); Kenji Ogawa, Tokyo (JP); Takayuki Kifuku, Tokyo (JP); Hiroyuki Kozuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 13/643,399

(22) PCT Filed: May 18, 2011

(86) PCT No.: PCT/JP2011/061415
§ 371 (c)(1),
(2), (4) Date: Oct. 25, 2012

(87) PCT Pub. No.: WO2011/152214
PCT Pub. Date: Dec. 8, 2011

(65) Prior Publication Data
US 2013/0041557 A1    Feb. 14, 2013

(30) Foreign Application Priority Data

Jun. 4, 2010   (JP) ................................. 2010-128834

(51) Int. Cl.
*B62D 5/04* (2006.01)
*B62D 1/28* (2006.01)
*B62D 6/00* (2006.01)

(52) U.S. Cl.
CPC ............... *B62D 1/286* (2013.01); *B62D 6/002* (2013.01)

(58) Field of Classification Search
CPC ...... B62D 7/159; B62D 5/0463; B62D 6/003; B62D 6/002; B62D 5/008
USPC .......... 180/402, 415, 443, 446; 701/1, 38, 41, 701/42; 303/146; 318/430
See application file for complete search history.

(56) References Cited

U.S. PATENT DOCUMENTS

| H1846 H * | 4/2000 | Poorman ........................ 180/418 |
| 6,408,236 B2 | 6/2002 | Nishiwaki et al. |

(Continued)

FOREIGN PATENT DOCUMENTS

| DE | 10 2008 041 727 A1 | 3/2010 |
| JP | 8 337181 | 12/1996 |

(Continued)

OTHER PUBLICATIONS

WO 2007/129573 A1.*

(Continued)

*Primary Examiner* — Helal A Algahaim
*Assistant Examiner* — Jelani Smith
(74) *Attorney, Agent, or Firm* — Oblon, McClelland, Maier & Neustadt, L.L.P.

(57) ABSTRACT

An automatic steering apparatus that can suppress steering wheel vibration and that can also smooth angular control. In the automatic steering apparatus, a motor that steers steered wheels is controlled by a control unit. Information from an angle sensor that generates a signal that corresponds to a steering angle of the steered wheels is sent to the control unit. The control unit corrects a target steering angle of the steered wheels such that angular acceleration of the target steering angle is less than or equal to a limiting value. The control unit controls the motor such that the steering angle of the steered wheels tracks the corrected target steering angle based on the information from the angle sensor.

9 Claims, 16 Drawing Sheets

(56) References Cited

U.S. PATENT DOCUMENTS

| | | | |
|---|---|---|---|
| 2001/0027364 A1* | 10/2001 | Matsuoka | 701/41 |
| 2002/0173882 A1* | 11/2002 | Tobaru et al. | 701/1 |
| 2007/0227806 A1* | 10/2007 | Wei | 180/446 |
| 2009/0192675 A1* | 7/2009 | Yamakado et al. | 701/38 |
| 2010/0168963 A1* | 7/2010 | Yamamoto | 701/42 |
| 2010/0256871 A1* | 10/2010 | Mitchell | 701/42 |
| 2011/0022271 A1* | 1/2011 | Ueda et al. | 701/41 |

FOREIGN PATENT DOCUMENTS

| | | |
|---|---|---|
| JP | 2003 237607 | 8/2003 |
| JP | 2005-313701 A | 11/2005 |
| JP | 2006 62406 | 3/2006 |
| JP | 2006 335250 | 12/2006 |
| JP | 2008-221978 A | 9/2008 |
| JP | 2009 234471 | 10/2009 |
| JP | 2010 100091 | 5/2010 |

OTHER PUBLICATIONS

International Search Report Issued Aug. 9, 2011 in PCT/JP11/61415 Filed May 18, 2011.

Preliminary Notice of Reasons for Rejection issued Nov. 12, 2013 in Japanese Patent Application No. 2012-518321 (with English translation).

Extended European Search Report issued on Sep. 2, 2014, in Patent Application No. 11789623.3.

* cited by examiner

AUTOMATIC STEERING APPARATUS

TECHNICAL FIELD

The present invention relates to an automatic steering apparatus that automatically steers a steered wheel using a driving force from a motor.

BACKGROUND ART

Conventionally, automotive automatic steering apparatuses are known in which it is determined that the steering wheel is operated by a driver and automatic steering is released if a detected value of steering torque on a steering shaft becomes greater than or equal to a predetermined value during automatic steering. However, the steering torque on the steering shaft may be increased not only due to operation of the steering wheel by the driver but also due to inertial force of the steering wheel. Consequently, if steering angular acceleration of the steering wheel is increased, there is a risk that automatic steering will be released erroneously due to the inertial force of the steering wheel.

Conventionally, in order to prevent the automatic steering being released erroneously, automotive automatic steering apparatuses have been proposed in which it is determine that a detected value of operating torque is increased by inertial force of a steering wheel instead of steering wheel operation by a driver and automatic steering is maintained without being released if a detected value of the steering angular acceleration is greater than a predetermined value even if a detected value of steering torque during automatic steering is greater than or equal to a predetermined value (see Patent Literature 1, for example).

Conventionally, in order to suppress vibration of a steering wheel during automatic steering that arises due to twisting of a torsion bar that is disposed on a steering shaft, automotive steering apparatuses have also been proposed in which a steering force that is determined based on torsion angle information for the torsion bar is applied to the steering shaft by a motor (see Patent Literature 2, for example).

CITATION LIST

Patent Literature

[Patent Literature 1]
Japanese Patent Laid-Open No. HEI 8-337181 (Gazette)
[Patent Literature 2]
Japanese Patent Laid-Open No. 2003-237607 (Gazette)

SUMMARY OF THE INVENTION

Problem to be Solved by the Invention

However, in the automotive steering apparatus that is shown in Patent Literature 2, if control of the motor that suppresses vibration of the steering wheel is strengthened, it becomes impossible to control the angular control for aligning the steering angle of the vehicle wheels to the target steering angle smoothly when the motor rotational angular acceleration is increased. In the automotive steering apparatus that is shown in Patent Literature 2, if the control that suppresses vibration of the steering wheel is weakened, it is difficult to suppress vibration of the steering wheel sufficiently when the motor rotational angular acceleration is increased.

In the automotive automatic steering apparatus that is shown in Patent Literature 1, because there is no means to suppress vibration of the steering wheel, if vibration arises in the steering wheel, the steering wheel vibration is continuous.

The present invention aims to solve the above problems and an object of the present invention is to provide an automatic steering apparatus that can suppress steering wheel vibration and that can also smooth angular control.

Means for Solving the Problem

In order to achieve the above object, according to one aspect of the present invention, there is provided an automatic steering apparatus characterized in including: a motor that steers a steered wheel; a steering angle detecting portion that generates a signal that corresponds to a steering angle of the steered wheel; and a controlling apparatus that corrects a target steering angle such that angular acceleration of the target steering angle is less than or equal to a limiting value, and controls the motor such that the steering angle tracks the corrected target steering angle based on information from the steering angle detecting portion.

Effects of the Invention

In an automatic steering apparatus according to the present invention, because the target steering angle is corrected such that the angular acceleration of the target steering angle is less than or equal to the limiting value, and the motor is controlled such that the steering angle of the steered wheel tracks the corrected target steering angle, the rotational angular acceleration of the motor can be limited directly, enabling increases in steering wheel inertial force to be suppressed. Thus, steering wheel vibration can be suppressed. Because the angular acceleration of the steering angle of the steered wheel is limited, angular control of the steering angle of the steered wheel can be smoothed.

DESCRIPTION OF EMBODIMENTS

Embodiment 1

Figure 1:
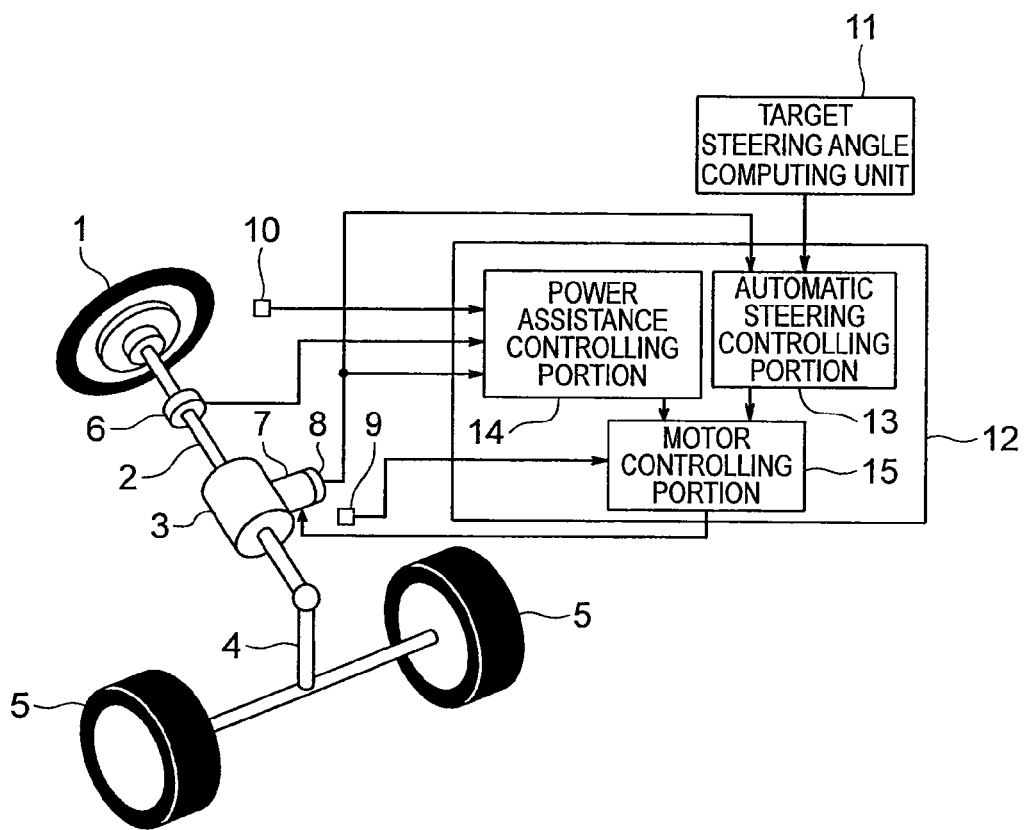
FIG. 1 is a configuration diagram that shows an automotive automatic steering apparatus according to Embodiment 1 of the present invention.

FIG. 1 is a configuration diagram that shows an automotive automatic steering apparatus according to Embodiment 1 of the present invention. In the figure, an end portion of a steering shaft 2 is linked to a steering wheel 1. The steering shaft 2 is rotated together with the steering wheel 1 so as to be centered around a shaft axis of the steering shaft 2. A steering mechanism portion 4 is disposed on the steering shaft 2. A pair of left and right steered wheels 5 are disposed on the steering mechanism portion 4. The steering mechanism portion 4 steers the steered wheels 5 in response to rotation of the steering shaft 2. Specifically, the steering angles of the steered wheels 5 change in response to a rotational angle of the steering shaft 2.

A speed reducing apparatus 3 and a torque sensor (a torque detecting portion) 6 are disposed on intermediate portions of the steering shaft 2. The torque sensor 6 is disposed on a portion of the steering shaft 2 between the speed reducing apparatus 3 and the steering wheel 1. The torque sensor 6 detects steering torque to which the steering shaft 2 is subjected.

In this example, a portion of the steering shaft 2 functions as a torsion bar. The torque sensor 6 generates a signal that corresponds to a torsion angle of the torsion bar of the steering shaft 2. The steering torque to which the steering shaft 2 is subjected is determined from the signal from the torque sensor 6.

A motor 7 that has a rotating shaft (a motor shaft) is disposed on the speed reducing apparatus 3. The motor 7 receives electric power and generates a torque that rotates the rotating shaft. The torque that the motor 7 generates is applied to the steering shaft 2 by means of the speed reducing apparatus 3. Thus, the rotational angle of the steering shaft 2 and the steering angles of the steered wheels 5 change in response to a rotational angle of the rotating shaft of the motor 7 (a motor rotational angle). In this example, a brushless direct-current (DC) motor is used as the motor 7. Moreover, a DC motor with brushes, for example, may also be used as the motor 7.

An angle sensor (a steering angle detecting portion) 8 that generates a signal that corresponds to the motor rotational angle is disposed on the motor 7. Consequently, the angle sensor 8 generates a signal that corresponds to both the rotational angle of the steering shaft 2 and the steering angle of each of the steered wheels. In this example, a resolver is used as the angle sensor 8. Moreover, an encoder, for example, may also be used as the angle sensor 8.

An electric current sensor 9 that detects electric current that flows through the motor 7, and a vehicle speed sensor 10 that detects vehicle speed are disposed on the vehicle.

A changeover switch (not shown) that can change a steering mode between manual steering in which the steered wheels 5 are steered by operation of the steering wheel 1, and automatic steering in which the steered wheels 5 are steered by the torque from the motor 7 automatically without operation of the steering wheel, is disposed inside a passenger compartment.

Information from the changeover switch is sent to a target steering angle computing unit 11. The target steering angle computing unit 11 computes a steering angle that is a target for the steered wheels 5 (a target steering angle) based on information from a plurality of detectors (cameras that take photographs outside the vehicle, for example) when the steering mode is set to automatic steering by operation of the changeover switch (during automatic steering).

Respective information from the torque sensor 6, the angle sensor 8, the electric current sensor 9, the vehicle speed sensor 10, and the target steering angle computing unit 11 is sent to the control unit 12. The control unit 12 controls the motor 7 by adjusting the electric current to the motor 7 based on the respective information from the torque sensor 6, the angle sensor 8, the electric current sensor 9, the vehicle speed sensor 10, and the target steering angle computing unit 11. Moreover, the target steering angle computing unit 11 is mounted to an automatic steering main controller that is separate from the control unit 12.

The control unit 12 has an automatic steering controlling portion 13, a power assistance controlling portion 14, and a motor controlling portion 15.

The automatic steering controlling portion 13 calculates the electric current that is required for the motor 7 to perform automatic steering as an automatic steering target electric current based on the respective information from the target steering angle computing unit 11 and the angle sensor 8.

The power assistance controlling portion 14 calculates the electric current that is required for the motor 7 to assist steering of the steering wheel 1 during manual steering as a power assistance target electric current based on the respective information from the torque sensor 6, the angle sensor 8, and the vehicle speed sensor 10.

The motor controlling portion 15 controls the electric current to the motor 7 based on the respective information from the automatic steering controlling portion 13, the power assistance controlling portion 14, and the electric current sensor 9. Computation by the control unit 12 is repeated at predetermined periods.

Figure 2:
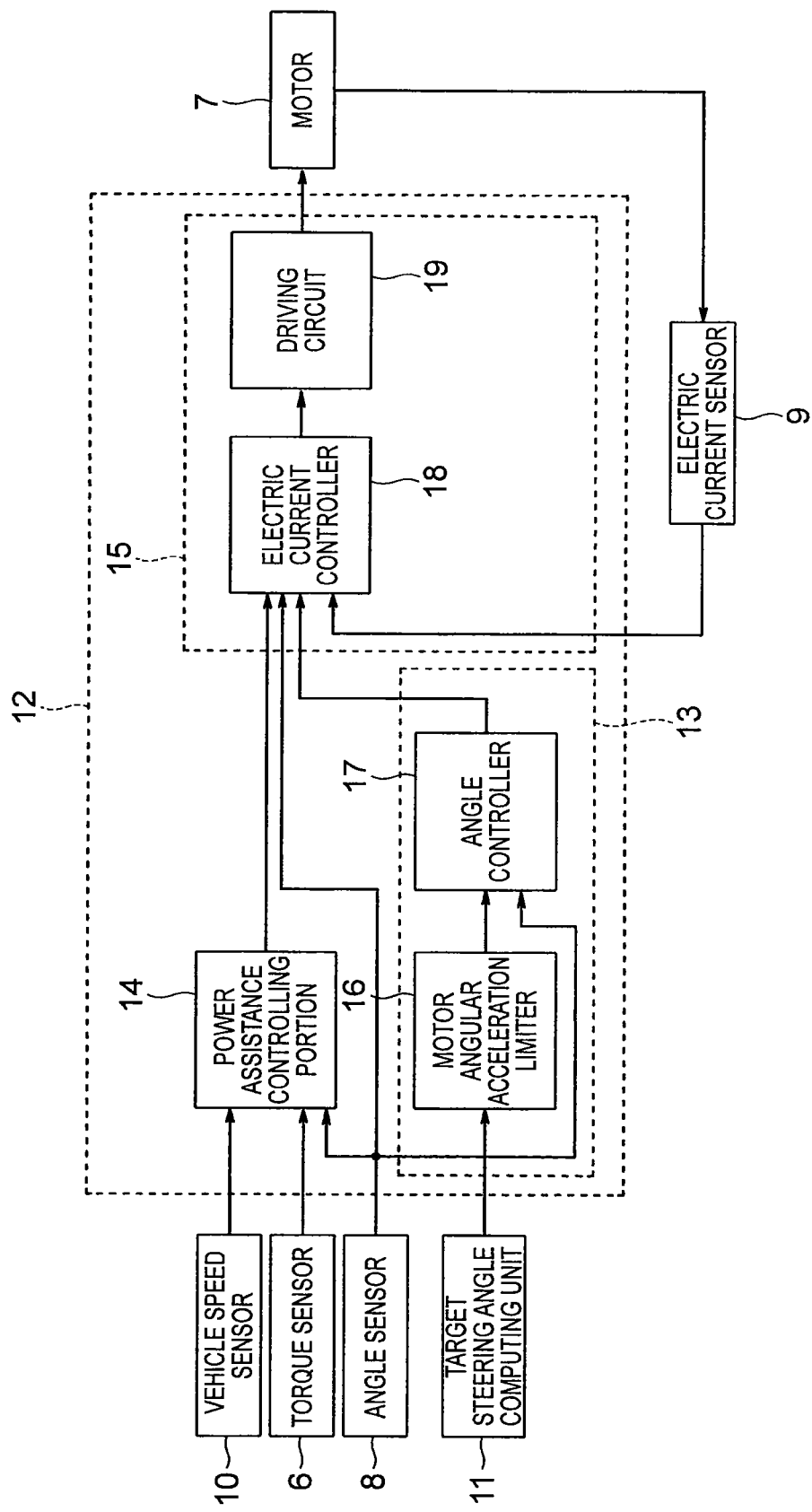
FIG. 2 is a block diagram that shows a control unit from FIG. 1.

FIG. 2 is a block diagram that shows the control unit 12 from FIG. 1. In the figure, the automatic steering controlling portion 13 has a motor angular acceleration limiter (an angular acceleration limiter) 16 and an angle controller 17.

The motor angular acceleration limiter 16 receives the target steering angle information from the target steering angle computing unit 11, and corrects the target steering angle such that the angular acceleration of the received target steering angle is less than or equal to a preset limiting value (a predetermined limiting value). Specifically, the motor angular acceleration limiter 16 receives the target steering angle from the target steering angle computing unit 11 as an uncorrected target steering angle $\theta_{ref}$, and calculates as a corrected target steering angle $\theta_{ref2}$ a target steering angle that is determined so as to limit the angular acceleration of the uncorrected target steering angle $\theta_{ref}$.

Figure 3:
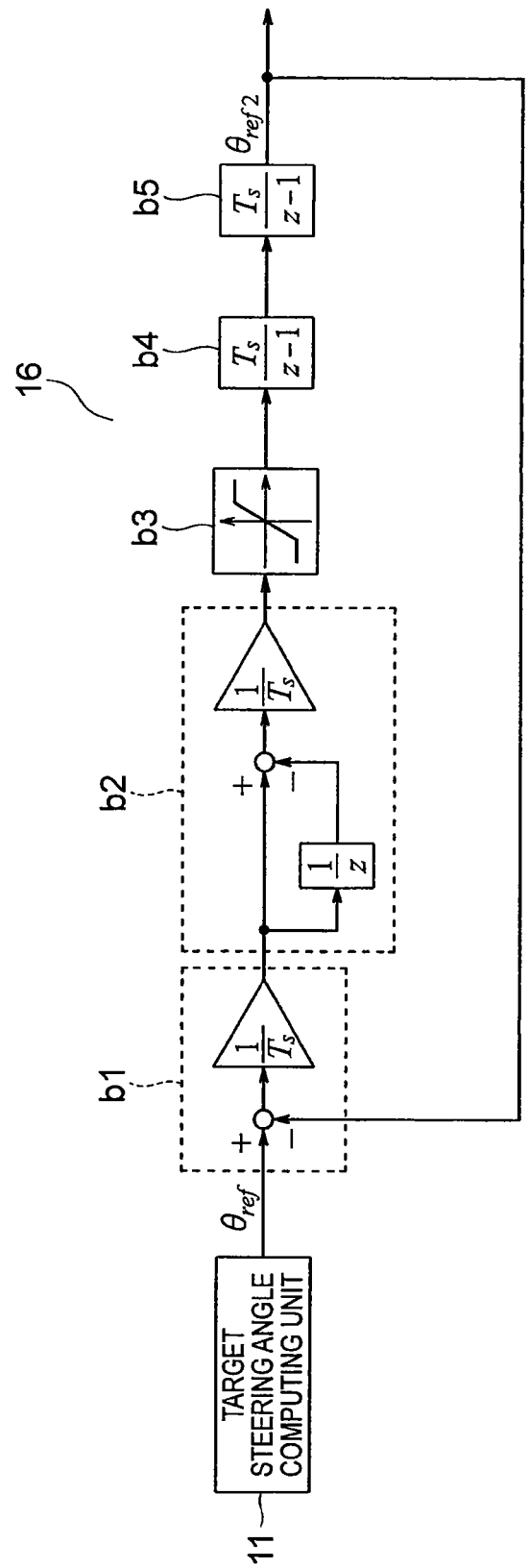
FIG. 3 is a block diagram that shows computing steps in a motor angular acceleration limiter from FIG. 2.

Now, FIG. 3 is a block diagram that shows computing steps in the motor angular acceleration limiter 16 from FIG. 2. In the figure, when the uncorrected target steering angle $\theta_{ref}$ is received from the target steering angle computing unit 11, the motor angular acceleration limiter 16 corrects the target steering angle $\theta_{ref}$ by performing calculations in the transfer elements b1 through b5 sequentially to calculate the corrected target steering angle $\theta_{ref2}$. Moreover, the block diagram in FIG. 3 is represented by discrete modeling, and z in FIG. 3 represents a z-transform.

In transfer element b1, a target steering angular speed is calculated by dividing deviation between the uncorrected target steering angle $\theta_{ref}$ and the corrected target steering angle $\theta_{ref2}$ by a sampling time (a computational period) Ts. Here, the value of the uncorrected target steering angle $\theta_{ref}$ is set as the value of the corrected target steering angle $\theta_{ref2}$ when executing the computation for the first time (i.e., an initial value of the corrected target steering angle $\theta_{ref2}$).

In transfer element b2, a target steering angular acceleration is calculated by dividing a difference between the target steering angular speed that is calculated in transfer element b1 and a previous value of the target steering angular speed by the sampling time Ts.

In transfer element (limiter) b3 the target steering angular acceleration that is calculated in transfer element b2 and the predetermined limiting value are compared, and the predetermined limiting value is set as the corrected target steering angular acceleration value if the target steering angular acceleration is greater than the predetermined limiting value, and the target steering angular acceleration value is retained as the corrected target steering angular acceleration value if the target steering angular acceleration is less than or equal to the predetermined limiting value.

In transfer element b4, a corrected target steering angular speed is calculated by integrating the corrected target steering angular acceleration from transfer element b3.

In transfer element b5, the corrected target steering angular speed that is calculated in transfer element b4 is integrated to calculate the corrected target steering angle $\theta_{ref2}$.

As shown in FIG. 2, the angle controller 17 calculates an angle controlling electric current that controls the motor rotational angle as the automatic steering target electric current based on the respective information from the angle sensor 8 and the motor angular acceleration limiter 16. Specifically, the angle controller 17 determines the steering angle $\theta_p$ of the steered wheels 5 based on the information from the angle sensor 8, and calculates the angle controlling electric current for making the determined steering angle $\theta_p$ of the steered wheels 5 track the corrected target steering angle $\theta_{ref2}$ (i.e., the target steering angle to which the angular acceleration is limited) as the automatic steering target electric current.

Figure 4:
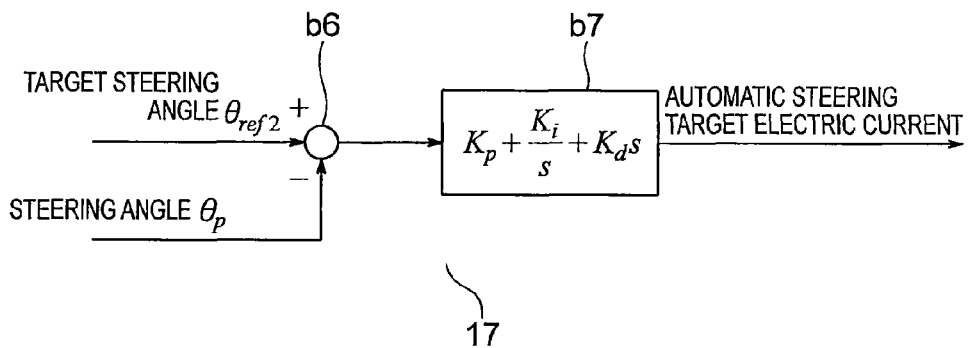
FIG. 4 is a block diagram that shows computing steps in the angle controller from FIG. 2.

Now, FIG. 4 is a block diagram that shows computing steps in the angle controller 17 from FIG. 2. In the figure, the angle controller 17 calculates the automatic steering target electric current (the angle controlling electric current) from the corrected target steering angle $\theta_{ref2}$ by performing calculations in transfer element b6 and transfer element b7 sequentially. Here, s is a Laplace operator, $K_p$ is proportional gain, $K_i$ is integrated gain, and $K_d$ is derivative gain.

In transfer element b6, deviation between the corrected target steering angle $\theta_{ref2}$ received from the motor angular acceleration limiter 16 and the steering angle $\theta_p$ that is determined based on the information from the angle sensor 8 is calculated.

In transfer element b7, the automatic steering target electric current (the angle controlling electric current) is calculated by implementing proportional-integral-derivative (PID) control on the deviation that is calculated in transfer element b6.

As shown in FIG. 2, the power assistance controlling portion 14 receives respective information from the torque sensor 6, the angle sensor 8, and the vehicle speed sensor 10. The power assistance controlling portion 14 calculates a basic assistance command electric current that generates a basic assisting torque in the motor 7 that reduces the steering torque for the driver based on the steering torque and vehicle speed that are determined from respective information from the torque sensor 6 and the vehicle speed sensor 10. The power assistance controlling portion 14 also calculates a viscosity compensation command electric current for adjusting a viscous feeling when operating the steering wheel 1 based on the motor rotational angular speed that is determined from the information from the angle sensor 8 (the motor rotational angle). In addition, the power assistance controlling portion 14 calculates a difference between the basic assistance command electric current the viscosity compensation command electric current as the power assistance target electric current.

As shown in FIG. 2, the motor controlling portion 15 has an electric current controller 18 and a driving circuit 19. The electric current controller 18 receives respective information from the power assistance controlling portion 14, the angle controller 17, the angle sensor 8, and the electric current sensor 9. The electric current controller 18 sets the power assistance target electric current as a command electric current during manual steering, and sets the automatic steering target electric current as the command electric current during automatic steering. The electric current controller 18 calculates an applied voltage for the motor 7 that corresponds to the information from the angle sensor 8 such that the electric current that is detected by the electric current sensor 9 agrees with the command electric current. The driving circuit 19 controls the motor 7 such that the applied voltage that is calculated by the electric current controller 18 is applied to the motor 7. Specifically, the electric current controller 18 calculates a pulse-width modulation (PWM) signal for controlling the applied voltage of the motor 7 (a voltage command signal) based on deviation between the electric current that is detected by the electric current sensor 9 and the command electric current. The driving circuit 19 performs PWM control over the motor 7 based on the voltage command signal from the electric current controller 18.

Figure 5:
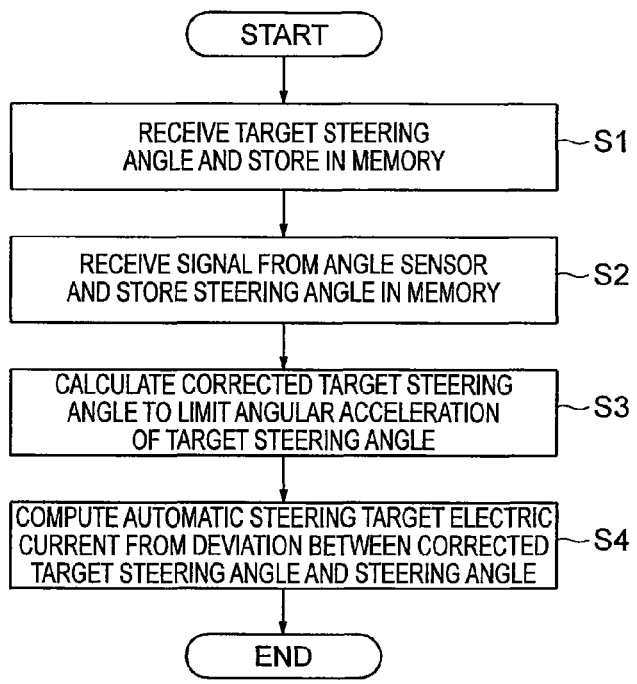
FIG. 5 is a flowchart that shows operation of an automatic steering controlling portion from FIG. 2.

Next, operation of the automatic steering controlling portion 13 will be explained. FIG. 5 is a flowchart that shows operation of the automatic steering controlling portion 13 from FIG. 2. The automatic steering controlling portion 13 stores the target steering angle $\theta_{ref}$ in memory on receiving the information from the target steering angle computing unit 11 (Step S1). The automatic steering controlling portion 13 stores the steering angle $\theta_p$ in memory on receiving the information from the angle sensor 8 (Step S2).

Next, the automatic steering controlling portion 13 corrects the target steering angle $\theta_{ref}$ in the motor angular acceleration limiter 16 by limiting the angular acceleration of the target steering angle $\theta_{ref}$ to less than or equal to the limiting value, and calculates the corrected target steering angle $\theta_{ref2}$ (Step S3).

Next, the automatic steering controlling portion 13 calculates the automatic steering target electric current based on the deviation between the corrected target steering angle $\theta_{ref2}$ and the steering angle $\theta_p$ in the angle controller 17 (Step S4).

In an automatic steering apparatus of this kind, because the target steering angle $\theta_{ref}$ is corrected such that the angular acceleration of the target steering angle $\theta_{ref}$ is less than or equal to the limiting value, and the motor 7 is controlled such that the steering angle $\theta_p$ of the steered wheels 5 tracks the corrected target steering angle $\theta_{ref2}$, the rotational angular acceleration of the motor 7 can be limited directly, enabling increases in steering wheel inertial force to be suppressed. Thus, steering wheel vibration can be suppressed. Because the angular acceleration of the steering angle $\theta_p$ of the steered wheels 5 is limited, angular control of the steering angle $\theta_p$ can be smoothed.

Figure 6:
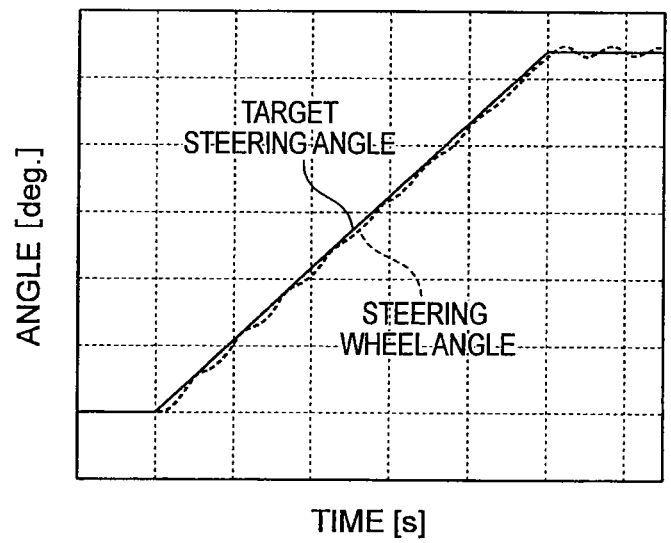
FIG. 6 is a graph that shows a relationship between steering wheel angle and time when a target steering angle is not corrected.
Figure 7:
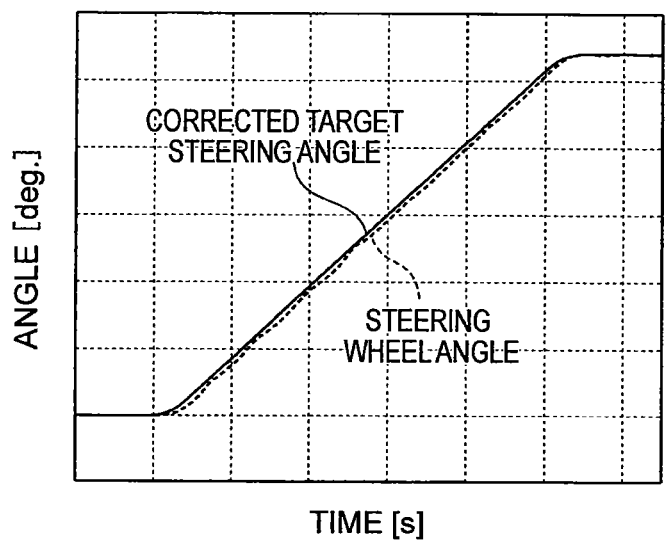
FIG. 7 is a graph that shows a relationship between steering wheel angle and time when the target steering angle is corrected.

Now, FIG. 6 is a graph that shows a relationship between steering wheel angle and time when a target steering angle is not corrected, and FIG. 7 is a graph that shows a relationship between steering wheel angle and time when the target steering angle is corrected. When the respective graphs in FIGS. 6 and 7 are compared, it can be seen that vibration of the steering wheel angle is suppressed more when correction of the target steering angle is performed (FIG. 7) than when correction of the target steering angle is not performed (FIG. 6). Thus, it has been confirmed that vibration of the steering wheel angle is suppressed by performing correction that limits the angular acceleration of the target steering angle.

Because the corrected target steering angle $\theta_{ref2}$ that is calculated in each computational period is used in a following computational period in order to determine the deviation between the uncorrected target steering angle $\theta_{ref}$ and the corrected target steering angle $\theta_{ref2}$, a final value of the corrected target steering angle $\theta_{ref2}$ can be converged with the uncorrected target steering angle $\theta_{ref}$. Consequently, errors in angular control of the steering angle $\theta_p$ as a result of limiting the angular acceleration of the target steering angle $\theta_{ref}$ can be suppressed.

Because the initial value of the corrected target steering angle $\theta_{ref2}$ when executing the computation for the first time is set to the value of the uncorrected target steering angle $\theta_{ref}$, the corrected target steering angle $\theta_{ref2}$ can be prevented from deviating significantly from the uncorrected target steering angle $\theta_{ref}$.

Moreover, in the above example, the initial value of the corrected target steering angle $\theta_{ref2}$ is set to the value of the uncorrected target steering angle $\theta_{ref}$, but the initial value of the corrected target steering angle $\theta_{ref2}$ may also be set to the value of the steering angle $\theta_p$. In that case, the steering angle $\theta_p$ is calculated based on the information from the angle sensor 8. Angular control of the steering angle $\theta_p$ can thereby be smoothed even if the initial value of the uncorrected target steering angle $\theta_{ref}$ and the steering angle $\theta_p$ are not aligned.

In other words, when the initial value of the uncorrected target steering angle $\theta_{ref}$ and the value of the steering angle $\theta_p$ do not agree with each other, a greater inertial force acts on the steering wheel 1 because the value of the automatic steering target electric current that is calculated by the angle controller 17 is greater, giving rise to vibration of the steering wheel 1. By setting the initial value of the corrected target steering angle $\theta_{ref2}$ to the steering angle $\theta_p$ of the steered wheels 5, the corrected target steering angle $\theta_{ref2}$ can be moved closer to the uncorrected target steering angle $\theta_{ref}$ while still limiting the angular acceleration to the limiting value. Consequently, even if the initial value of the target steering angle $\theta_{ref}$ and the steering angle $\theta_p$ do not agree with each other, angular control of the steering angle $\theta_p$ can be smoothed while still suppressing vibration of the steering wheel 1.

Embodiment 2

Figure 8:
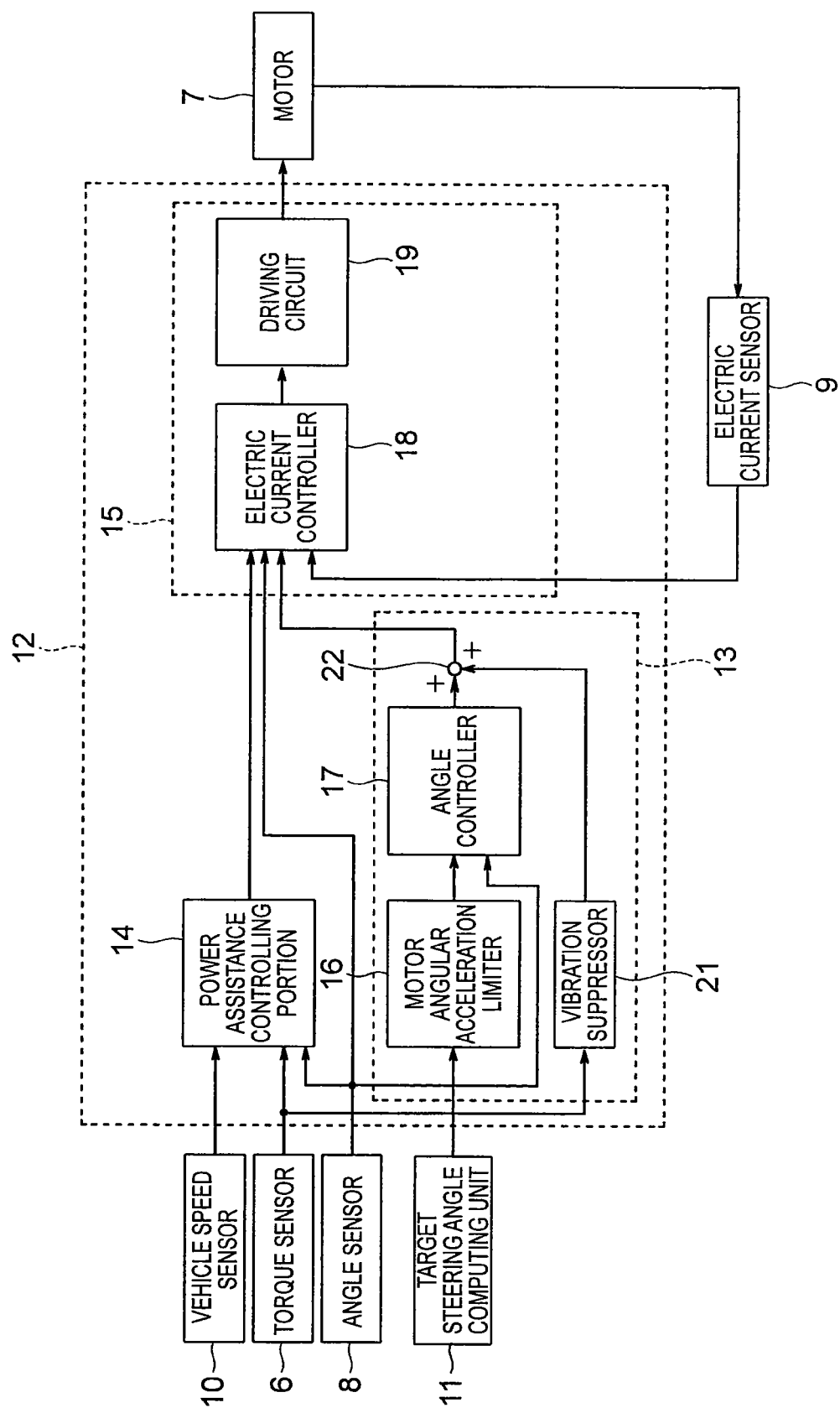
FIG. 8 is a block diagram that shows a control unit of an automotive automatic steering apparatus according to Embodiment 2 of the present invention.

FIG. 8 is a block diagram that shows a control unit 12 of an automotive automatic steering apparatus according to Embodiment 2 of the present invention. In the figure, an automatic steering controlling portion 13 has a vibration suppressor 21 and an adder 22 in addition to a motor angular acceleration limiter 16 and an angle controller 17.

The vibration suppressor 21 calculates a vibration suppressing electric current that corresponds to steering torque to which a steering shaft 2 is subjected based on information from a torque sensor 6. Specifically, the vibration suppressor 21 calculates the vibration suppressing electric current by applying gain to the steering torque that is detected by the torque sensor 6.

The adder 22 adds the vibration suppressing electric current that is calculated by the vibration suppressor 21 to an angle controlling electric current that is calculated by the angle controller 17, and sets the sum of the angle controlling electric current and the vibration suppressing electric current as an automatic steering target electric current. The rest of the configuration is similar or identical to that of Embodiment 1.

In an automatic steering apparatus of this kind, because the motor 7 is controlled based on the information from the torque sensor 6, the torque that the motor 7 generates can be changed in response to the steering torque to which the steering shaft 2 is subjected, enabling vibration of the steering wheel 1 that arises due to torsion of the steering shaft 2 to be further suppressed. Since the gain of the vibration suppressor 21 can be set smaller than conventionally, the vibration suppressor 21 and the angle controller 17 do not interfere with each other, enabling angular control of the steering angle $\theta_p$ to be smoothed precisely. In other words, steering wheel vibration is further reduced during automatic steering, and smooth angular control can be achieved.

Embodiment 3

Figure 9:
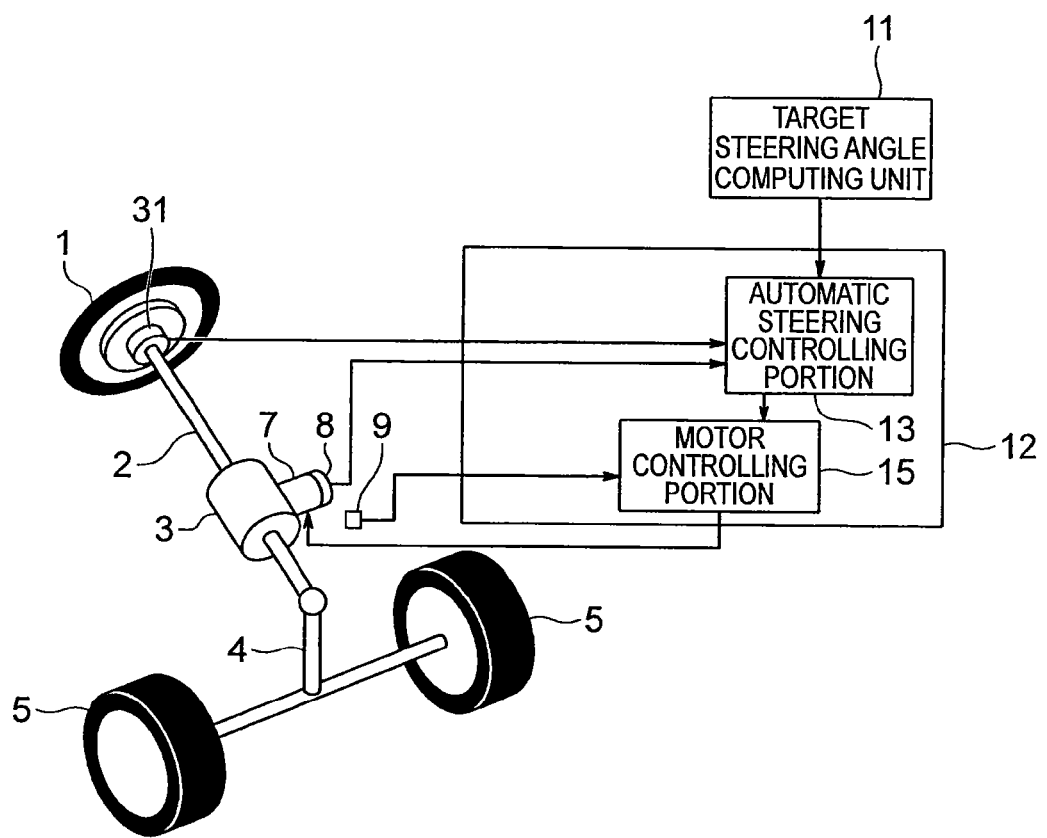
FIG. 9 is a configuration diagram that shows an automotive automatic steering apparatus according to Embodiment 3 of the present invention.

FIG. 9 is a configuration diagram that shows an automotive automatic steering apparatus according to Embodiment 3 of the present invention. In this example, a torque sensor 6 is not disposed on a steering shaft 2. Consequently, no portion of the steering shaft 2 is a torsion bar. A steering wheel angle sensor 31 that generates a signal that corresponds to the rotational angle of a steering wheel 1 is disposed on the steering wheel 1. The respective information from the steering wheel angle sensor 31, an angle sensor 8, an electric current sensor 9, and a target steering angle computing unit 11 is sent to a control unit 12. In this example, information from a vehicle speed sensor 10 is not sent to the control unit 12. The control unit 12 does not have a power assistance controlling portion 14, but has an automatic steering controlling portion 13 and a motor controlling portion 15.

The automatic steering controlling portion 13 calculates an automatic steering target electric current based on the respective information from the steering wheel angle sensor 31, the angle sensor 8, and the target steering angle computing unit 11. The motor controlling portion 15 controls the motor 7 such that the electric current that is detected by the electric current sensor 9 tracks the automatic steering target electric current that is calculated by the automatic steering controlling portion 13.

Figure 10:
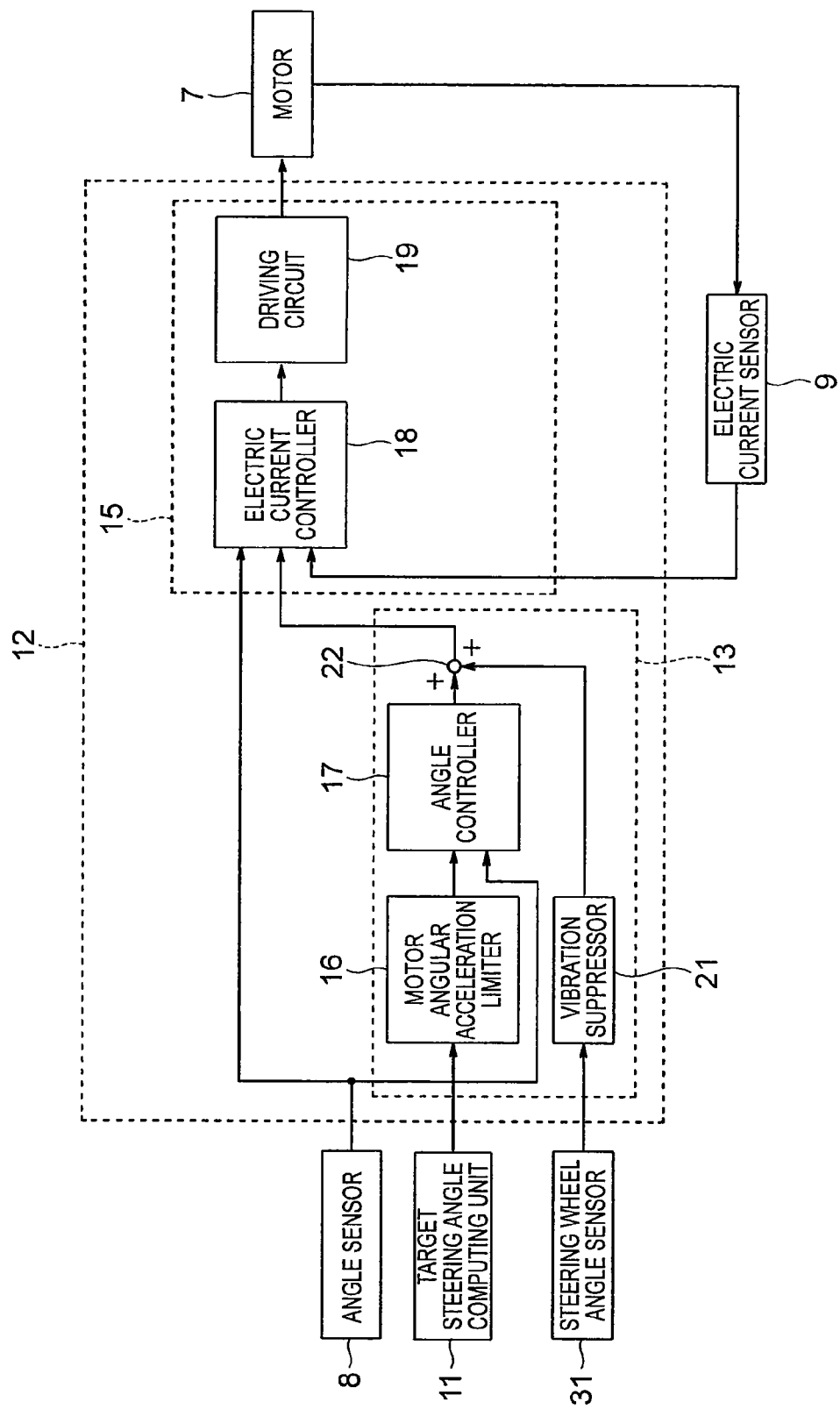
FIG. 10 is a block diagram that shows a control unit from FIG. 9.

FIG. 10 is a block diagram that shows the control unit 12 from FIG. 9. In the figure, the automatic steering controlling portion 13 has a motor angular acceleration limiter 16, an angle controller 17, a vibration suppressor 21, and an adder 22. Configuration of the motor angular acceleration limiter 16, the angle controller 17, and the adder 22 is similar or identical to the configuration in Embodiment 2.

The information from the steering wheel angle sensor 31 is sent to the vibration suppressor 21. The vibration suppressor 21 calculates a vibration suppressing electric current based on the information from the steering wheel angle sensor 31. Specifically, the vibration suppressor 21 determines the rotational angle of the steering wheel 1 (the steering wheel angle) based on the information from the steering wheel angle sensor 31, determines the steering wheel angular acceleration by determining the second derivative of the determined steering wheel angle, and then calculates the vibration suppressing electric current by applying gain to the determined steering wheel angular acceleration.

Because operation of the steering wheel 1 by a driver is not performed during automatic steering, an equation of motion of the steering wheel 1 is expressed by Expression (1).

$$J_h d\omega_h = -T_{sens} \quad (1)$$

Here, $J_h$ is the inertial force of the steering wheel 1, $d\omega_h$ is the second derivative of the steering wheel angle (the steering wheel angular acceleration), and $T_{sens}$ is the steering torque.

Consequently, the vibration suppressor 21 does not detect the steering torque $T_{sens}$ directly, but calculates the vibration suppressing electric current by determining the steering wheel angular acceleration $d\omega_h$ which is the second derivative of the steering wheel angle using the relationship in Expression (1). The rest of the configuration is similar or identical to that of Embodiment 2.

In an automatic steering apparatus of this kind, because the motor 7 is controlled based on the information from the steering wheel angle sensor 31, vibration of the steering wheel 1 that arises as a result of torsion due to elastic deformation of the steering shaft 2 itself and the inertial force of the steering wheel can be further suppressed. Cost reductions can also be achieved since a torque sensor is not required.

Moreover, in the above example, a torque sensor 6 is not disposed on the steering shaft 2, but a torque sensor 6 may also be disposed on the steering shaft 2, and information from both the torque sensor 6 and the steering wheel angle sensor 31 sent to the vibration suppressor 21. In that case, vibration suppressing electric currents are calculated separately in the vibration suppressor 21 based on the respective information from the torque sensor 6 and the steering wheel angle sensor 31. Redundancy can thereby be added to the vibration suppressor 21, enabling improvements in reliability of the vibration suppressor 21 to be achieved.

Embodiment 4

Figure 11:
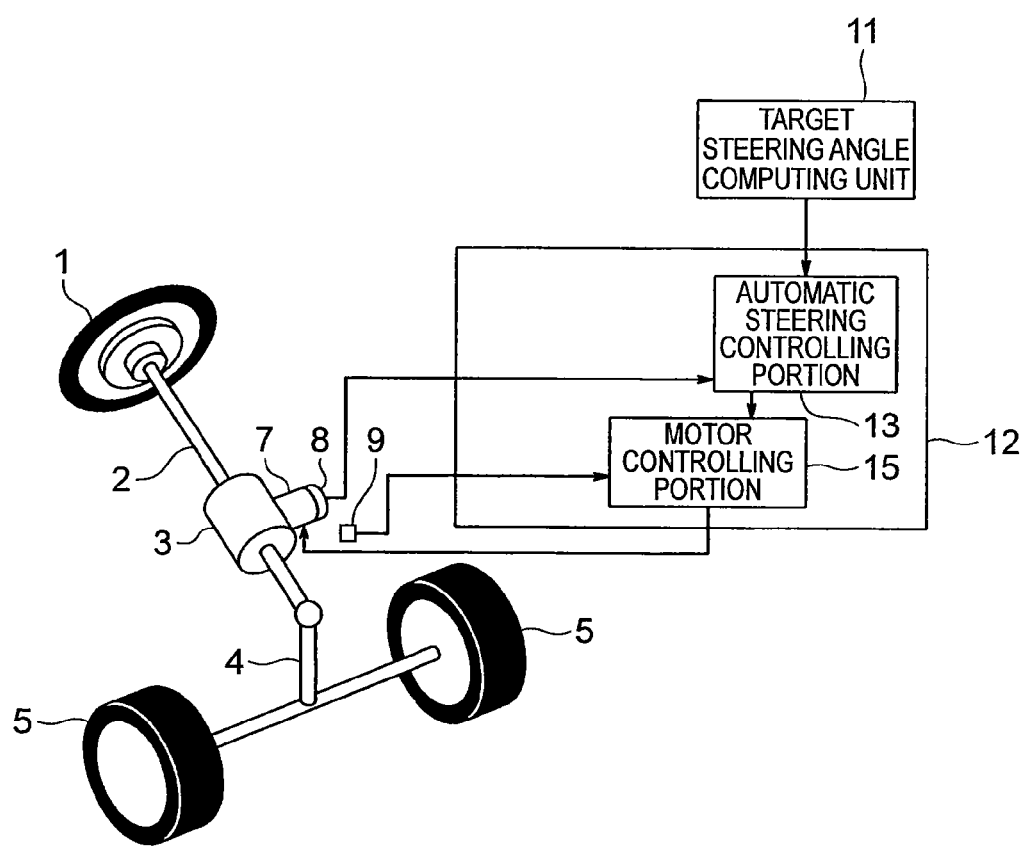
FIG. 11 is a configuration diagram that shows an automotive automatic steering apparatus according to Embodiment 4 of the present invention.

FIG. 11 is a configuration diagram that shows an automotive automatic steering apparatus according to Embodiment 4 of the present invention. In the figure, a steering wheel angle sensor 31 and a torque sensor 6 are not disposed on either a steering wheel 1 or a steering shaft 2. Respective information from an angle sensor 8, an electric current sensor 9, and a target steering angle computing unit 11 is sent to a control unit 12, but information from a vehicle speed sensor 10 is not sent. The control unit 12 does not have a power assistance controlling portion 14, but has an automatic steering controlling portion 13 and a motor controlling portion 15.

The target steering angle computing unit 11 computes a target steering angle for steered wheels 5 based on information from a plurality of detectors (cameras that capture images outside a vehicle, for example), and determines whether or not automatic steering of the vehicle is automatic steering in an emergency. Examples of automatic steering in an emergency include automatic steering that is performed in order to avoid an obstruction in front of the vehicle, for example. The target steering angle computing unit 11 outputs to the automatic steering controlling portion 13: target steering angle information; and information that indicates whether or not the automatic steering is in an emergency (an emergency flag signal). In this example, the target steering angle computing unit 11 stops outputting the emergency flag signal if it is determined that the automatic steering is in an emergency (emergency automatic steering), and outputs the emergency flag signal if it is determined that the automatic steering is during normal operation that is not an emergency (normal automatic steering).

Figure 12:
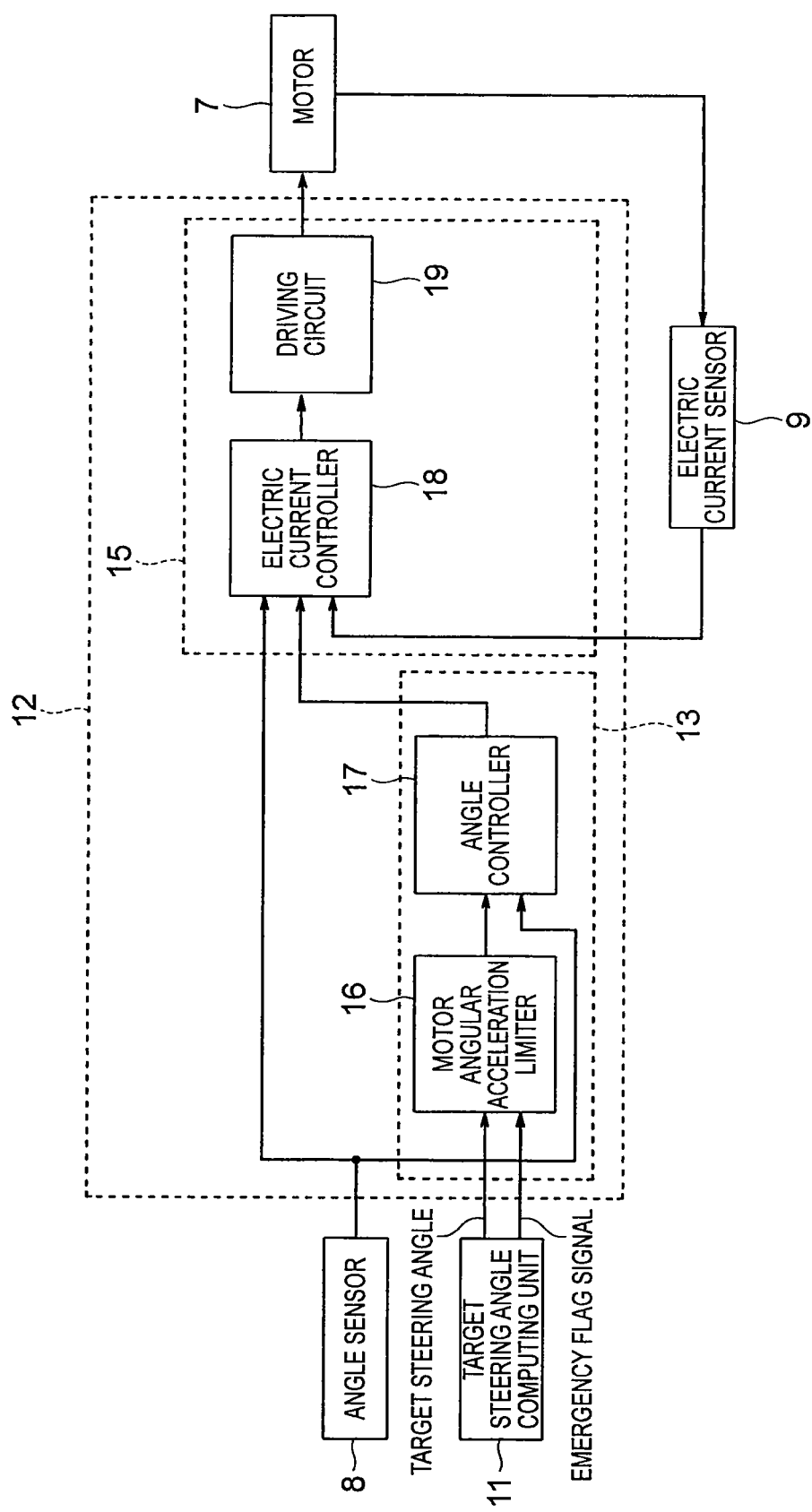
FIG. 12 is a block diagram that shows a control unit from FIG. 11.

FIG. 12 is a block diagram that shows the control unit 12 from FIG. 11. The target steering angle information and the emergency flag signal are sent from the target steering angle computing unit 11 to the motor angular acceleration limiter 16. The motor angular acceleration limiter 16 determines whether or not correction of the target steering angle is required based on whether or not the emergency flag signal has been received. Specifically, if receipt of the emergency flag signal is "1" and it is therefore determined that there is normal automatic steering, then the motor angular acceleration limiter 16 performs correction that limits the angular acceleration of the target steering angle to less than or equal to a limiting value on the target steering angle $\theta_{ref}$ and sets it as the corrected target steering angle $\theta_{ref2}$, and if receipt of the emergency flag signal is "0" and it is therefore determined that there is emergency automatic steering, the motor angular acceleration limiter 16 does not correct the target steering angle, and retains the target steering angle $\theta_{ref}$ from the target steering angle computing unit 11 as the corrected target steering angle $\theta_{ref2}$. In other words, processing by the motor angular acceleration limiter 16 is stopped if it is determined by the motor angular acceleration limiter 16 that there is emergency automatic steering.

An angle controller 17 determines the steering angle of the steered wheels 5 based on the information from the angle sensor 8, and calculates an angle controlling electric current as an automatic steering target electric current such that the determined steering angle tracks the corrected target steering angle $\theta_{ref2}$ that is calculated by the motor angular acceleration limiter 16. The rest of the configuration is similar or identical to that of Embodiment 1.

Figure 13:
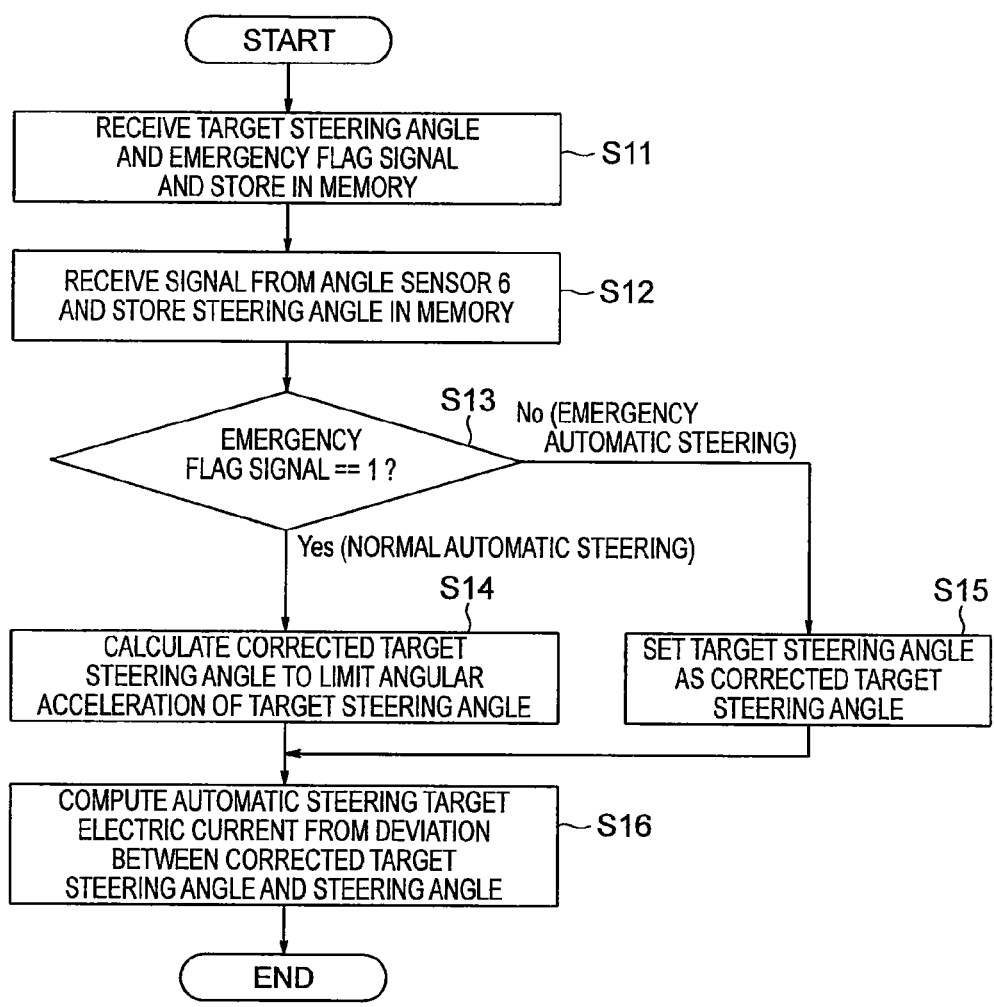
FIG. 13 is a flowchart that shows operation of an automatic steering controlling portion from FIG. 12.

Next, operation of the automatic steering controlling portion 13 will be explained. FIG. 13 is a flowchart that shows operation of the automatic steering controlling portion 13 from FIG. 12. The automatic steering controlling portion 13 stores the target steering angle $\theta_{ref}$ and information that indicates whether or not the emergency flag signal has been received in memory on receiving the information from the target steering angle computing unit 11 (Step S11). The automatic steering controlling portion 13 stores the steering angle $\theta_p$ in memory on receiving the information from the angle sensor 8 (Step S12).

Next, the automatic steering controlling portion 13 determines whether or not the emergency flag signal is received from the target steering angle computing unit 11 in the motor angular acceleration limiter 16 (Step S13).

If receipt of the emergency flag signal is "1" and it is therefore determined that there is normal automatic steering, then the automatic steering controlling portion 13 corrects the target steering angle $\theta_{ref}$ in the motor angular acceleration limiter 16 by limiting the angular acceleration of the target steering angle $\theta_{ref}$ to less than or equal to the limiting value, and calculates the corrected target steering angle $\theta_{ref2}$ (Step S14).

If receipt of the emergency flag signal is "0" and it is therefore determined that there is emergency automatic steering, then the automatic steering controlling portion 13 stops processing by the motor angular acceleration limiter 16, and retains the target steering angle $\theta_{ref}$ in the motor angular acceleration limiter 16 as the corrected target steering angle $\theta_{ref2}$ (Step S15).

Next, the automatic steering controlling portion 13 calculates the automatic steering target electric current based on the deviation between the corrected target steering angle $\theta_{ref2}$ and the steering angle $\theta_p$ in the angle controller 17 (Step S16).

In an automatic steering apparatus of this kind, because correction of the target steering angle is stopped during emergency automatic steering, vibration of the steering wheel 1 can be suppressed during normal automatic steering, and operation of the automatic steering can also be made to track the target steering angle early during emergency automatic steering. When avoiding an obstruction ahead using automatic steering, for example, it is more important to steer the steering wheel early than to suppress vibration that arises in the steering wheel 1. Consequently, in this embodiment, the steering angle of the steered wheels 5 can be made to track the target steering angle early by stopping the correction of the target steering angle, enabling operational reliability during emergency automatic steering to be improved.

Embodiment 5

Moreover, in Embodiment 4, correction of the target steering angle during emergency automatic steering (i.e., processing by the motor angular acceleration limiter 16) is stopped, but a limiting value may also be changed depending on whether or not the emergency flag signal has been received by the motor angular acceleration limiter 16.

Specifically, the motor angular acceleration limiter 16 sets a first reference value A1 as the limiting value if receipt of the emergency flag signal is "1" and it is therefore determined that there is normal automatic steering, and sets a second reference value A0 that is greater than the first reference value A1 (A0>A1) as the limiting value if receipt of the emergency flag signal is "0" and it is therefore determined that there is emergency automatic steering. The rest of the configuration is similar or identical to that of Embodiment 4.

Figure 14:
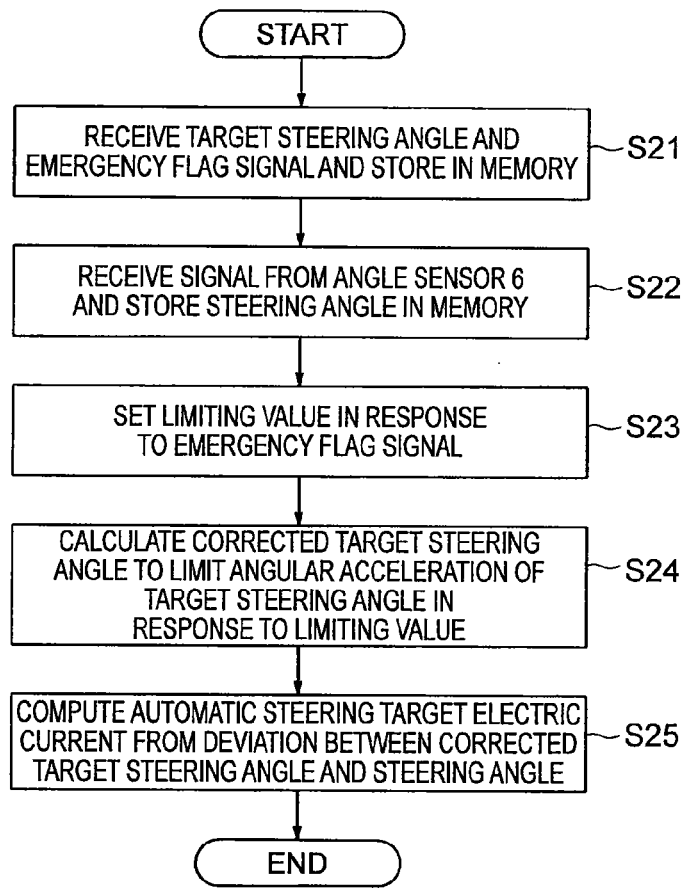
FIG. 14 is a flowchart that shows operation of an automatic steering controlling portion according to Embodiment 5 of the present invention.

Next, operation of the automatic steering controlling portion 13 will be explained. FIG. 14 is a flowchart that shows operation of the automatic steering controlling portion 13 according to Embodiment 5 of the present invention. The automatic steering controlling portion 13 stores the target steering angle $\theta_{ref}$ and information that indicates whether or not the emergency flag signal has been received in memory on receiving the information from the target steering angle computing unit 11 (Step S21). The automatic steering controlling portion 13 stores the steering angle $\theta_p$ in memory on receiving the information from the angle sensor 8 (Step S22).

Next, the automatic steering controlling portion 13 sets either the first reference value A1 or the second reference value A0 as the limiting value depending on whether or not the emergency flag signal has been received in the motor angular acceleration limiter 16. Specifically, based on whether or not the emergency flag signal has been received in the motor angular acceleration limiter 16, the automatic steering controlling portion 13 sets a first reference value A1 as the limiting value if it is determined that there is normal automatic steering, and sets the second reference value A0 as the limiting value if it is determined that there is emergency automatic steering (Step S23).

Next, the automatic steering controlling portion 13 corrects the target steering angle $\theta_{ref}$ in the motor angular acceleration limiter 16 such that the angular acceleration of the target steering angle $\theta_{ref}$ is less than or equal to the limiting value, and calculates the corrected target steering angle $\theta_{ref2}$ (Step S24).

Next, the automatic steering controlling portion 13 calculates the automatic steering target electric current based on the deviation between the corrected target steering angle $\theta_{ref2}$ and the steering angle $\theta_p$ in the angle controller 17 (Step S25).

In an automatic steering apparatus of this kind, because the limiting value is changed during normal automatic steering and during emergency automatic steering, vibration of the steering wheel 1 can be suppressed by setting a predetermined limiting value during normal automatic steering. The degree of limitation of the motor rotational angular acceleration can also be reduced by increasing the limiting value during emergency automatic steering to more than during normal automatic steering. Consequently, the steering angle of the steered wheels 5 can be made to track the target steering angle early during emergency automatic steering, enabling operational reliability during emergency automatic steering to be improved.

Moreover, in the above example, the respective limiting values during normal automatic steering and during emergency automatic steering, reference values A1 and A0, are constant, but each of the limiting values may also be changed continuously with the passage of time. By reducing the limiting value during at least one of either normal automatic steering or emergency automatic steering continuously with the passage of time, the corrected target steering angle $\theta_{ref2}$ can be changed even more smoothly, enabling vibration of the steering wheel 1 to be further suppressed.

In the above example, only information that determines whether or not there is emergency automatic steering is included in the emergency flag signal, but the emergency flag signal from the target steering angle computing unit 11 can be set as a signal that corresponds to an urgency level, and information that determines the urgency level may be added to the emergency flag signal. In that case, the reference value that corresponds to the urgency level is set as the limiting value by the motor angular acceleration limiter 16. Thus, limitation that corresponds to conditions can be performed even more appropriately for the angular acceleration of the target steering angle.

In the above example, the limiting value is set based on the emergency flag signal, but the information for changing the limiting value is not limited to the emergency flag signal.

Figure 15:
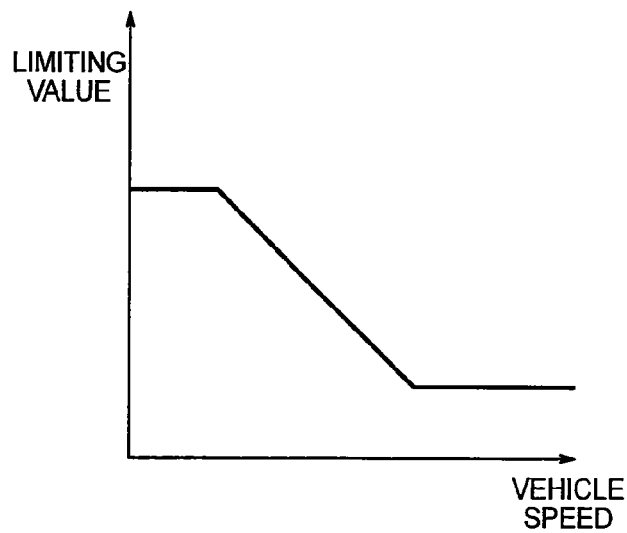
FIG. 15 is a graph that shows a relationship between vehicle speed and a limiting value when the limiting value is set in response to vehicle speed in the automatic steering controlling portion according to Embodiment 5 of the present invention.

The limiting value may also be changed based on information that corresponds to vehicle speed, for example. In that case, the information that corresponds to the vehicle speed can be information from the vehicle speed sensor 10. The limiting value is stored in memory in advance so as to correspond to the vehicle speed, as shown in FIG. 15. Because the steering wheel steering angle is reduced as the vehicle speed increases, the angular acceleration of the target steering angle is also reduced. Consequently, if the limiting value is set so as to be reduced continuously as the vehicle speed increases, the angular acceleration of the steering wheel steering angle can be reduced when the vehicle speed is high, enabling vibration of the steering wheel 1 to be suppressed more effectively.

The limiting value may also be changed based on information that corresponds to a road surface coefficient of friction. In that case, a road surface sensor that generates a signal that corresponds to the road surface coefficient of friction (a detecting portion) can be disposed on the vehicle. The limiting value is stored in memory in advance so as to correspond to the road surface coefficient of friction. On a slippery road surface, which has a low road surface coefficient of friction, because vehicle response to steering is delayed even if steering is performed rapidly, the vehicle may become unstable, and it is desirable for the angular acceleration of the target steering angle to be smaller. Consequently, if the limiting value is set so as to be reduced continuously as the road surface coefficient of friction decreases, sharp steering can be prevented when the road surface coefficient of friction is low, enabling vibration of the steering wheel 1 to be suppressed more effectively.

In addition, the limiting value may also be changed based on information that corresponds to steering torque. In that case, the information that corresponds to the steering torque can be information from the torque sensor 6. The limiting value is stored in memory in advance so as to correspond to the steering torque. For example, if the limiting value is set so as to be reduced continuously as the steering torque increases, the angular acceleration of the target steering angle can be limited appropriately if steering torque increases and it is determined that inertial force that gives rise to vibration of the steering wheel 1 is large, enabling vibration of the steering wheel 1 to be suppressed. If the driver places a hand on the steering wheel 1 with the intention of operating the steering wheel 1, because the limiting value is reduced as the steering torque increases, the change in the corrected target steering angle can be reduced, enabling interference between operation by the driver and automatic steering to be reduced. Thus, operation of the steering wheel 1 by the driver can be performed smoothly.

Embodiment 6

This example has a configuration that is similar or identical to that of Embodiment 1 above except that the processing details of the motor angular acceleration limiter 16 are different. Consequently, in this example, the processing details of Step 3 in FIG. 5 when calculating the corrected target steering angle $\theta_{ref2}$ from the target steering angle $\theta_{ref}$ are different than Embodiment 1.

Figure 16:
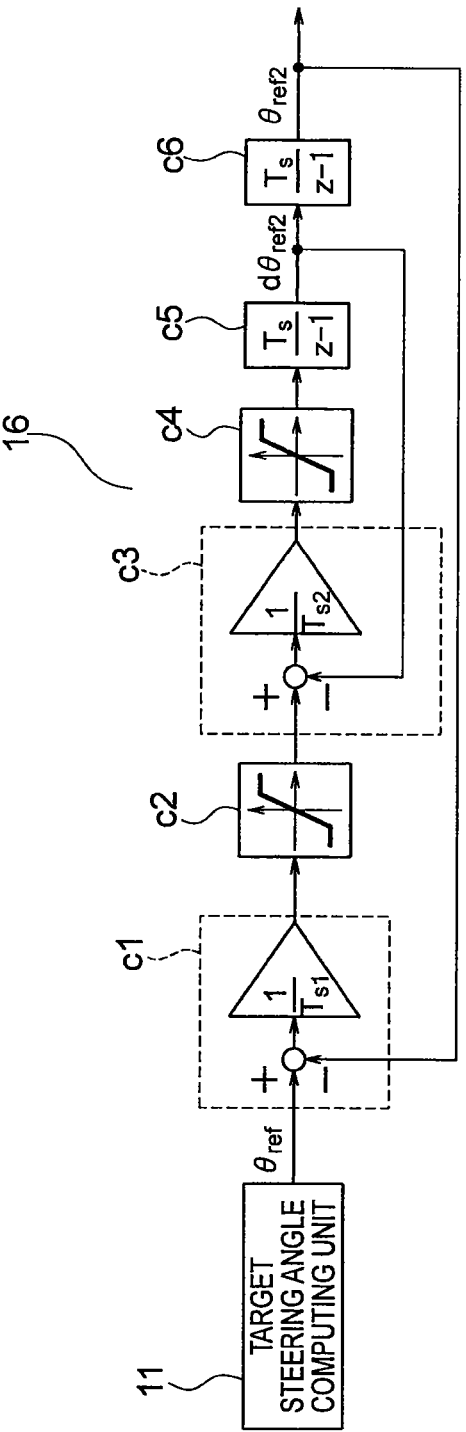
FIG. 16 is a block diagram that shows computing steps in a motor angular acceleration limiter of an automatic steering apparatus according to Embodiment 6 of the present invention.

FIG. 16 is a block diagram that shows computing steps in the motor angular acceleration limiter 16 of an automatic steering apparatus according to Embodiment 6 of the present invention. In the figure, when the uncorrected target steering angle $\theta_{ref}$ is received from the target steering angle computing unit 11, the motor angular acceleration limiter (the angular acceleration limiter) 16 corrects the target steering angle $\theta_{ref}$ by performing calculations in the transfer elements c1 through c6 sequentially to calculate the corrected target steering angle $\theta_{ref2}$. Moreover, the block diagram in FIG. 16 is represented by discrete modeling, and z in FIG. 16 represents a z-transform. The target steering angle $\theta_{ref}$ is the target steering angle of the steered wheels 5 converted for the steering shaft 2.

Transfer element c1 has a similar or identical construction to transfer element b1 in FIG. 3. Specifically, in transfer element c1, a target steering angular speed is calculated by dividing deviation between the uncorrected target steering angle $\theta_{ref}$ and the corrected target steering angle $\theta_{ref2}$ by a sampling time $T_{s1}$. Here, the value of the steering angle $\theta_p$ is set as the value of the corrected target steering angle $\theta_{ref2}$ when executing the computation for the first time (i.e., an initial value of the corrected target steering angle $\theta_{ref2}$). Angular control of the steering angle $\theta_p$ can thereby be smoothed even if the initial value of the uncorrected target steering angle $\theta_{ref}$ and the steering angle $\theta_p$ are not aligned. Moreover, the value of the uncorrected target steering angle $\theta_{ref2}$ may also be set as the initial value of the value of the corrected target steering angle $\theta_{ref2}$.

In transfer element (limiter) c2 the target steering angular acceleration that is calculated in transfer element c1 and a first limiting value (a speed limiting value) are compared, and the target steering angular speed value is limited to less than or equal to the first limiting value. In other words, in transfer element c2, the first limiting value is set as the target steering angular speed value if the target steering angular speed is greater than the first limiting value, and the target steering angular speed value is retained as the target steering angular speed value if the target steering angular speed is less than or equal to the first limiting value.

In transfer element c3, a target steering angular acceleration is calculated by dividing deviation between the target steering angular speed that is limited to less than or equal to the first limiting value in transfer element c2 and the corrected target steering angular speed $d\theta_{ref2}$ that is calculated in transfer element c5 by a sampling time $T_{s2}$. Here, the value of the corrected target steering angular speed $d\theta_{ref2}$ when executing the computation for the first time (i.e., an initial value of the corrected target steering angular speed $d\theta_{ref2}$) is set to 0 or the differential value ($d\theta_{ref2}$) of the steering angle $\theta_p$.

In transfer element (limiter) c4 the target steering angular acceleration that is calculated in transfer element c3 and a second limiting value (an acceleration limiting value) are compared, and the target steering angular acceleration value is limited to less than or equal to the second limiting value. Specifically, in transfer element c4, the second limiting value is set as the corrected target steering angular acceleration value if the target steering angular acceleration is greater than the second limiting value, and the target steering angular acceleration value is retained as the target steering angular acceleration value if the target steering angular acceleration is less than or equal to the second limiting value.

In transfer element c5, the corrected target steering angular acceleration that is limited to less than or equal to the second limiting value in transfer element c4 is integrated to calculate the corrected target steering speed $d\theta_{ref2}$.

In transfer element c6, the corrected target steering angular speed that is calculated in transfer element c5 is integrated to calculate the corrected target steering angle $\theta_{ref2}$.

Because the motor angular acceleration limiter 16 has transfer elements c1 through c6 such as those described above, except for transfer elements c2 and c4 (the two limiters), processing for calculating from the uncorrected target steering angle $\theta_{ref}$ to the corrected target steering angle $\theta_{ref2}$ is a second-order low-pass filter that includes two sets of integrating elements (transfer elements c5 and c6).

If the cutoff frequency of the low-pass filter is $\omega_c$, and the damping ratio is $\zeta_c$, then the sampling time $T_{s1}$ in transfer element c1 and the sampling time $T_{s2}$ in transfer element c3 are respectively expressed as follows:

$$T_{s1} = 2\zeta_c/\omega_c \quad (2)$$

$$T_{s2} = 1/(2\zeta_c\omega_c) \quad (3)$$

The rest of the configuration is similar or identical to that of Embodiment 1.

In an automatic steering apparatus of this kind, because the angular speed of the target steering angle $\theta_{ref}$ is also limited to less than or equal to the predetermined speed limiting value in addition to the angular acceleration of the target steering angle $\theta_{ref}$ being limited to less than or equal to the predetermined acceleration limiting value, angular control of the steering angle $\theta_p$ can be performed even more smoothly. Because the motor angular acceleration limiter 16 has a second-order low-pass filter (transfer elements c1, c3, c5, and c6) and two limiters (transfer elements c2 and c4), the motor angular acceleration limiter 16 can be designed easily for the purpose of designing a low-pass filter.

Because the target steering angle can be made to converge on the target value after being allowed to overshoot by the second-order low-pass filter while limiting the rotational angular acceleration and the rotational speed of the motor 7 using the two limiters, residual torsion of the tires that occurs during the steering at a vehicle speed of 0 (steering at rest) can be suppressed, for example, while suppressing steering wheel vibration, enabling residual electric current of the motor 7 that arises due to residual torsion of the tires to be suppressed.

Figure 17:
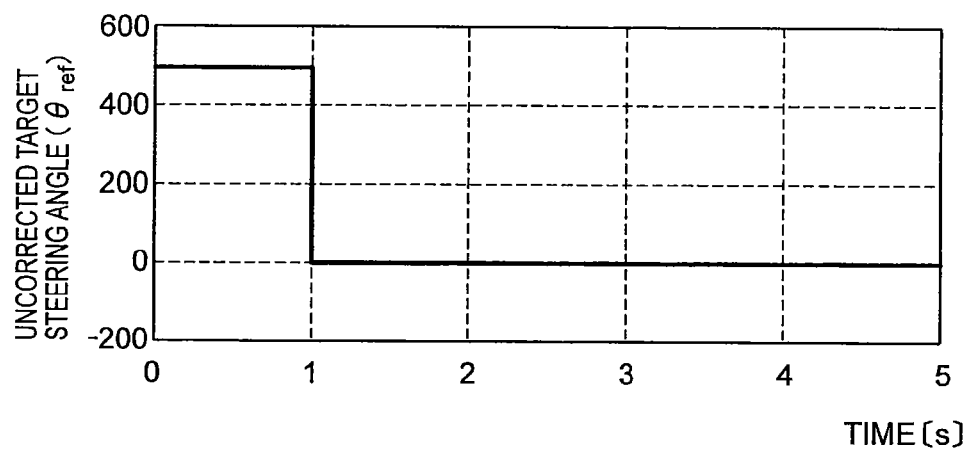
FIG. 17 is a graph that shows temporal changes in an uncorrected target steering angle that is sent to the motor angular acceleration limiter from a target steering angle computing unit from FIG. 16.
Figure 18:
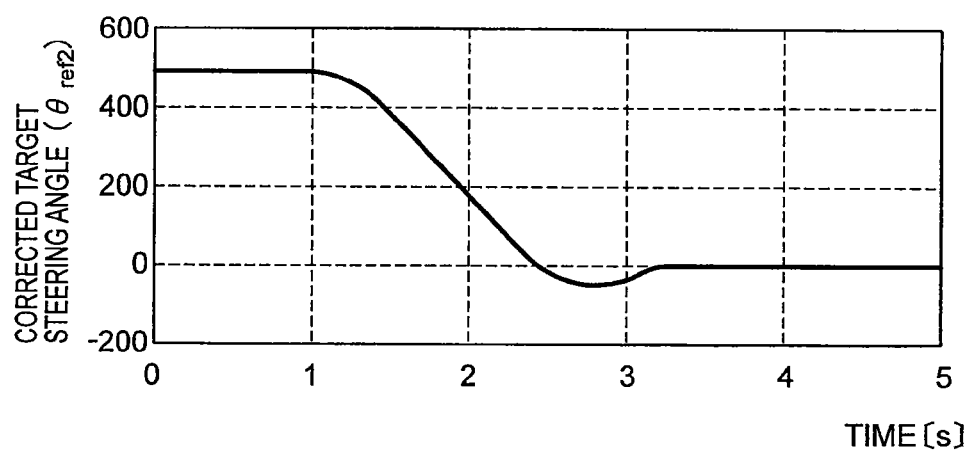
FIG. 18 is a graph that shows temporal changes in a corrected target steering angle that is calculated by the motor angular acceleration limiter in FIG. 16.

FIG. 17 is a graph that shows temporal changes in an uncorrected target steering angle $\theta_{ref}$ that is sent to the motor angular acceleration limiter 16 from a target steering angle computing unit 11 from FIG. 16. FIG. 18 is a graph that shows temporal changes in a corrected target steering angle $\theta_{ref2}$ that is calculated by the motor angular acceleration limiter 16 in FIG. 16. As shown in FIGS. 17 and 18, it can be seen that the corrected target steering angle $\theta_{ref2}$ (FIG. 18) changes more smoothly than the uncorrected target steering angle $\theta_{ref}$ (FIG. 17). It can also be seen that the corrected target steering angle $\theta_{ref2}$ converges to the target value after being allowed to overshoot.

Moreover, in the above example, the order of the low-pass filter that is included in the motor angular acceleration limiter 16 (i.e., the number of sets of differentiating elements and integrating elements) is second order, but the motor angular acceleration limiter 16 may also include a third-order or greater low-pass filter. In that case, limiters (transfer elements) that are equal in number to the order of the low-pass filter are included in the motor angular acceleration limiter 16. Consequently, if the order of the low-pass filter is set to third order, for example, jerk, angular acceleration, and angular speed of the target steering angle can each be limited to less than or equal to a limiting value, enabling angular control of the steering angle $\theta_p$ to be made even smoother.

In the above example, a motor angular acceleration limiter 16 that has a plurality of orders of low-pass filter and a plurality of limiters is applied to the motor angular acceleration limiter 16 according to Embodiment 1, but a motor angular acceleration limiter 16 that has a plurality of orders of low-pass filter and a plurality of limiters may also be applied to the motor angular acceleration limiters 16 according to Embodiments 2 through 5.

The number of orders in the low-pass filter and the number of limiters may also be different. For example, the limiter may also be set only to transfer element (limiter) c4 in a second-order low-pass filter, and the target steering angular acceleration that is calculated by transfer element c3 and a predetermined second limiting value (an acceleration limiting value) compared to limit the target steering angular acceleration value to less than or equal to the second limiting value.

Embodiment 7

In Embodiments 1 through 6 above, the target steering angle $\theta_{ref}$ from the target steering angle computing unit 11 is corrected by the motor angular acceleration limiter 16, and then the automatic steering target electric current for making the steering angle $\theta_p$ of the steered wheels 5 track the corrected target steering angle $\theta_{ref2}$ is calculated by the angle controller 17, but an automatic steering target electric current for making a steering angle $\theta_p$ of steered wheels 5 track a target steering angle $\theta_{ref}$ from a target steering angle computing unit 11 may also be calculated by an angle controller 17, and then the automatic steering target electric current that is calculated by the angle controller 17 corrected by a motor angular acceleration limiter 16.

In other words, in the present embodiment, the order of processing by the motor angular acceleration limiter 16 and the angle controller 17 of the automatic steering controlling portion 13 is reversed compared to Embodiment 1.

Figure 19:
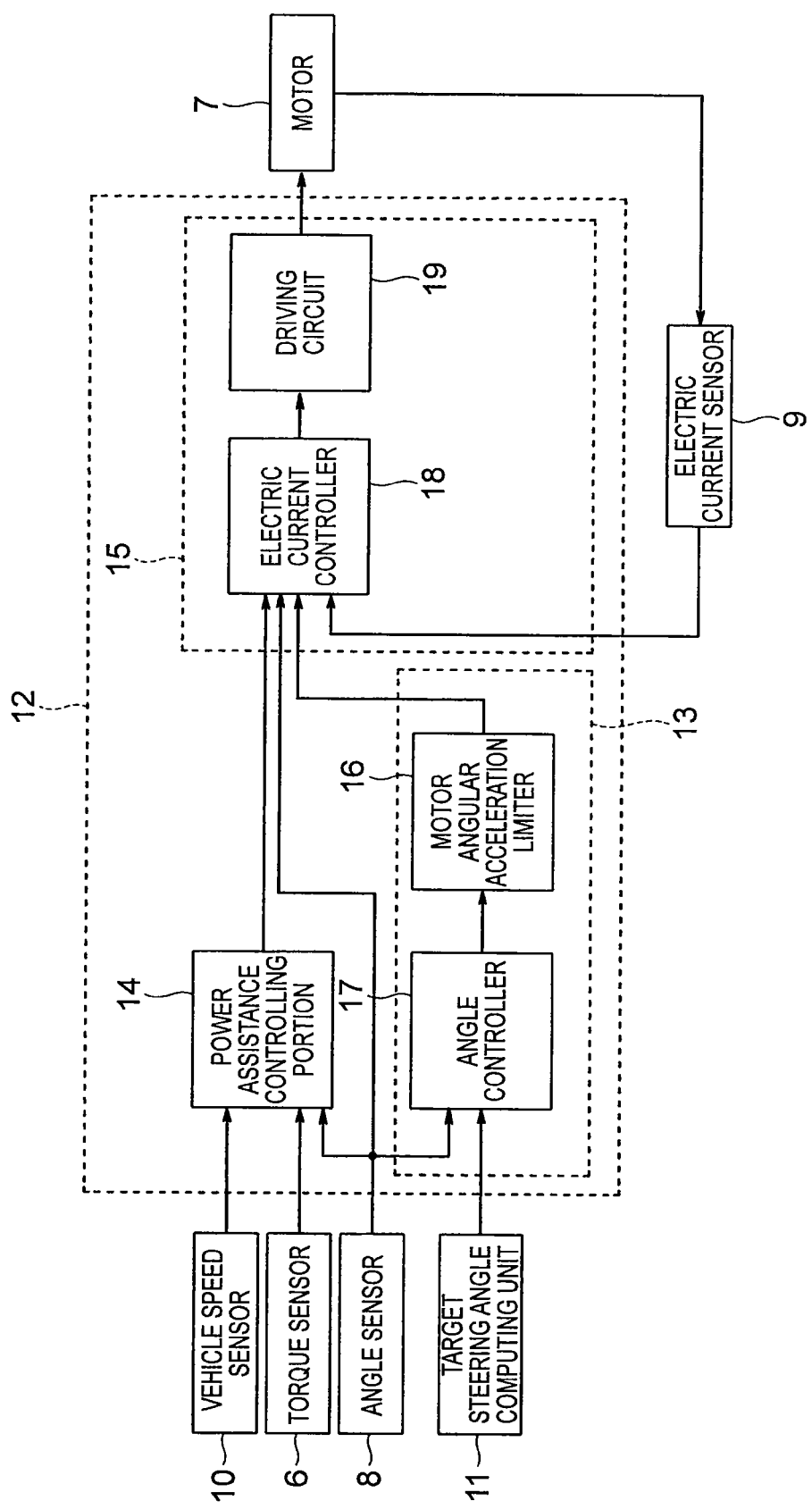
FIG. 19 is a block diagram that shows a control unit of an automatic steering apparatus according to Embodiment 7 of the present invention.

FIG. 19 is a block diagram that shows a control unit 12 of an automatic steering apparatus according to Embodiment 7 of the present invention. In the figure, the angle controller 17 calculates an angle controlling electric current that controls the motor rotational angle as the automatic steering target electric current $i_{ref}$ based on the respective information from the angle sensor 8 and the target steering angle computing unit 11. Specifically, the angle controller 17 determines the steering angle $\theta_p$ of the steered wheels 5 based on the information from the angle sensor 8, and calculates the angle controlling electric current for making the determined steering angle $\theta_p$ of the steered wheels 5 track the target steering angle $\theta_{ref}$ from the target steering angle computing unit 11 as the automatic steering target electric current $i_{ref}$. The angle controller 17 has a configuration that is similar or identical to that of the angle controller 17 according to Embodiment 1.

The motor angular acceleration limiter 16 corrects the automatic steering target electric current $i_{ref}$ in such a way that the amount of change from the previous value of the automatic steering target electric current $i_{ref}$ that is calculated by the angle controller 17 is less than or equal to a predetermined limiting value to be set as a corrected automatic steering target electric current $i_{ref2}$. Since the automatic steering target electric current $i_{ref}$ is the angle controlling electric current for making the steering angle $\theta_p$ of the steered wheels 5 track the target steering angle $\theta_{ref}$, this means that the motor angular acceleration limiter 16 effectively limits the angular acceleration of the steering angle $\theta_p$ to less than or equal to a predetermined limiting value.

Figure 20:
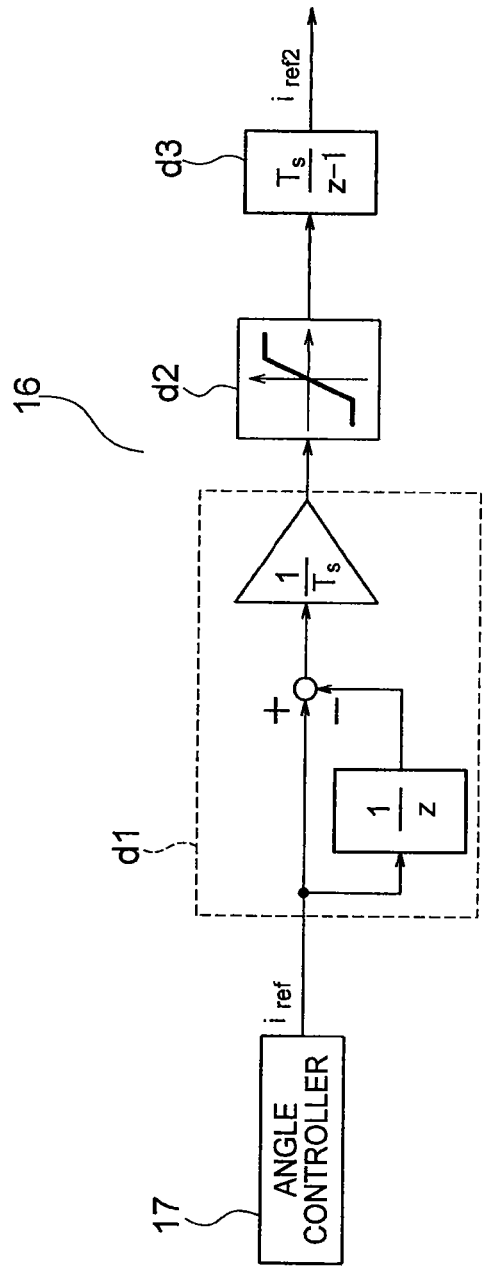
FIG. 20 is a block diagram that shows computing steps in a motor angular acceleration limiter from FIG. 19.

FIG. 20 is a block diagram that shows computing steps in the motor angular acceleration limiter 16 from FIG. 19. In the figure, when the uncorrected automatic steering target electric current $i_{ref}$ is received from the angle controller 17, the motor angular acceleration limiter 16 corrects the uncorrected automatic steering target electric current $i_{ref}$ by performing calculations in the transfer elements d1 through d3 sequentially to calculate the corrected automatic steering target electric current $i_{ref2}$.

In transfer element d1, the amount of change from the previous value of the automatic steering target electric current $i_{ref}$ is calculated by dividing a difference between the automatic steering target electric current $i_{ref}$ from the angle controller 17 and the previous value of the automatic steering target electric current $i_{ref}$ by a sampling time $T_s$.

In transfer element (limiter) d2, the amount of change in the automatic steering target electric current $i_{ref}$ that is calculated in transfer element d1 is limited to less than or equal to a predetermined limiting value. Specifically, in transfer element d2, the amount of change in the automatic steering target electric current $i_{ref}$ and the predetermined limiting value are compared, and the predetermined limiting value is set as a corrected amount of change if the amount of change in the automatic steering target electric current $i_{ref}$ is greater than the predetermined limiting value, and the amount of change is retained as the corrected amount of change if the amount of change in the automatic steering target electric current $i_{ref}$ is less than or equal to the predetermined limiting value. The predetermined limiting value in transfer element d2 is set based on the angular acceleration of the target steering angle, the angular acceleration of the steering wheel angle, or the rotational angular acceleration of the motor 7.

In transfer element d3, the corrected automatic steering target electric current $i_{ref2}$ is calculated by integrating the corrected amount of change from transfer element d2.

The rest of the configuration is similar or identical to that of Embodiment 1.

Even if the amount of change from the previous value of the automatic steering target electric current $i_{ref}$ is limited to less than or equal to the predetermined limiting value in this manner, the corrected automatic steering target electric current $i_{ref2}$ can be limited in response to angular acceleration, enabling the rotational angular acceleration of the motor 7 to be limited. Thus, increases in inertial force of the steering wheel can be suppressed, enabling steering wheel vibration to be suppressed. Because the angular acceleration of the steering angle $\theta_p$ of the steered wheels 5 is limited to less than or equal to the limiting value, angular control of the steering angle $\theta_p$ can be smoothed.

Moreover, in the above example, an automatic steering controlling portion 13 in which the order of processing in the motor angular acceleration limiter 16 and the angle controller 17 is interchanged is applied to an automatic steering controlling portion 13 according to Embodiment 1, but an automatic steering controlling portion 13 in which the order of the processing in the motor angular acceleration limiter 16 and the angle controller 17 is interchanged may also be applied to the automatic steering controlling portions 13 according to Embodiments 2 through 6.

In each of the above embodiments, the target steering angle computing unit 11 that sets the target steering angle is mounted to an automatic steering main controller that is separate from the control unit 12, but the target steering angle computing unit 11 may also be included in the control unit 12.

EXPLANATION OF NUMBERING

1 STEERING WHEEL, 2 STEERING SHAFT, 5 STEERED WHEELS, 6 TORQUE SENSOR (TORQUE DETECTING PORTION), 7 MOTOR, 8 ANGLE SENSOR (STEERING ANGLE DETECTING PORTION), 12 CONTROL UNIT (CONTROLLING APPARATUS).

The invention claimed is:

1. An automatic steering apparatus comprising:
a motor that steers a steered wheel;
a steering angle detecting portion that generates a signal that corresponds to a steering angle of the steered wheel; and
a controlling apparatus comprising an angular acceleration limiter that corrects an uncorrected target steering angle to be a corrected target steering angle such that angular acceleration of the target steering angle is less than or equal to a limiting value, the controlling apparatus controlling the motor such that the steering angle tracks the corrected target steering angle based on information from the steering angle detecting portion,
wherein:
the angular acceleration limiter calculates a target steering angular speed based on a difference between the uncorrected target steering angle and the corrected target angle, calculates a target steering angular acceleration based on a difference between the target steering angular speed and a previous value of the target steering angular speed, calculates a corrected target steering angular speed by integrating a corrected target steering angular acceleration that is determined so as to limit the target steering angular acceleration with a predetermined limiting value, and calculates the corrected target steering angle by integrating the corrected target steering angular speed.

2. The automatic steering apparatus according to claim 1, wherein:
the steered wheel is steered in response to rotation of a steering shaft that is linked to a steering wheel;
the automatic steering apparatus further comprises a torque detecting portion that detects steering torque to which the steering shaft is subjected; and
the controlling apparatus computes a vibration suppressing electric current by applying gain to information from the torque detecting portion, computes an angle controlling electric current based on deviation between the corrected target steering angle and the steering angle, and computes a target electric current for the motor from a sum of the vibration suppressing electric current and the angle controlling electric current.

3. The automatic steering apparatus according to claim 1, wherein:
the steered wheel is steered in response to rotation of a steering shaft that is linked to a steering wheel;
the automatic steering apparatus further comprises a steering wheel angle detecting portion that detects a rotational angle of the steering wheel; and
the controlling apparatus determines steering wheel angular acceleration based on information from the steering wheel angle detecting portion, computes a vibration suppressing electric current by applying gain to the steering wheel angular acceleration, computes an angle controlling electric current based on deviation between the corrected target steering angle and the steering angle, and computes a target electric current for the motor from a sum of the vibration suppressing electric current and the angle controlling electric current.

4. An automatic steering apparatus comprising:
a motor that steers a steered wheel;
a steering angle detecting portion that generates a signal that corresponds to a steering angle of the steered wheel; and
a controlling apparatus comprising an angular acceleration limiter that corrects an uncorrected target steering angle to be a corrected target steering angle such that angular acceleration of the target steering angle is less than or equal to a limiting value, the controlling apparatus controlling the motor such that the steering angle tracks the corrected target steering angle based on information from the steering angle detecting portion,
wherein:
the angular acceleration limiter calculates a target steering angular speed based on a difference between the uncorrected target steering angle and the corrected target angle, limits the target steering angular speed with a first limiting value, calculates a target steering angular acceleration based on a difference between a limited target steering angular speed that is determined so as to limit the target steering angular speed with a first limiting value and a corrected target steering angular speed, calculates a corrected target steering angular acceleration by limiting the target steering angular acceleration with a second limiting value, calculates the corrected target steering angular speed by integrating the corrected target steering angular acceleration, and calculates the corrected target steering angle by integrating the corrected target steering angular speed.

5. The automatic steering apparatus according to claim 4, wherein:
the steered wheel is steered in response to rotation of a steering shaft that is linked to a steering wheel;
the automatic steering apparatus further comprises a torque detecting portion that detects steering torque to which the steering shaft is subjected; and
the controlling apparatus computes a vibration suppressing electric current by applying gain to information from the torque detecting portion, computes an angle controlling electric current based on deviation between the corrected target steering angle and the steering angle, and computes a target electric current for the motor.

6. The automatic steering apparatus according to claim 4, wherein:
the steered wheel is steered in response to rotation of a steering shaft that is linked to a steering wheel;
the automatic steering apparatus further comprises a steering wheel angle detecting portion that detects a rotational angle of the steering wheel; and
the controlling apparatus determines steering wheel angular acceleration based on information from the steering wheel angle detecting portion, computes a vibration suppressing electric current by applying gain to the steering wheel angular acceleration, computes an angle controlling electric current based on deviation between the corrected target steering angle and the steering angle, and computes a target electric current for the motor from a sum of the vibration suppressing electric current and the angle controlling electric current.

7. The automatic steering apparatus according to claim 4, wherein:
the controlling apparatus converges the target steering angle on the target value after allowing the target steering angle to overshoot.

8. An automatic steering apparatus comprising:
a motor that steers a steered wheel;
a steering angle detecting portion that generates a signal that corresponds to a steering angle of the steered wheel; and
a controlling apparatus comprising an angular acceleration limiter that limits angular acceleration of the steering angle to less than or equal to a limiting value, the controlling apparatus controlling the motor such that the steering angle tracks a target steering angle based on information from the steering angle detecting portion, wherein:
the angular acceleration limiter limits an amount of change in a target electric current for the motor with a predetermined limiting value that is set based on anyone or more of angular acceleration of the target steering angle, angular acceleration of a steering wheel angle, or rotational angular acceleration of the motor.

9. An automatic steering apparatus comprising: a motor that steers a steered wheel; a steering angle detecting portion that generates a signal that corresponds to a steering angle of the steered wheel; and a controlling apparatus comprising a jerk limiter that limits jerk of the steering angle to less than or equal to a limiting value with third-order low-pass filter, the controlling apparatus controlling the motor such that the steering angle tracks a target steering angle based on information from the steering angle detecting portion; wherein the controlling apparatus repeats computation that corrects the target steering angle at predetermined periods, an initial value of the corrected target steering angle is set to a value of the steering angle or a value of the uncorrected target steering angle, and an initial value of the corrected target steering angular speed is set to zero or a differential value of the steering angle.

* * * * *